United States Patent [19]

Warren, Jr. et al.

[11] 4,418,570
[45] Dec. 6, 1983

[54] ICE THICKNESS INDUCTOR PROBE

[75] Inventors: Hollie B. Warren, Jr.; Thomas A. Paulley, both of Houston, Tex.

[73] Assignee: Exxon Production Research Co., Houston, Tex.

[21] Appl. No.: 328,562

[22] Filed: Dec. 8, 1981

[51] Int. Cl.³ .............................................. G01F 23/00
[52] U.S. Cl. ............................... 73/304 R; 73/170 A; 336/144
[58] Field of Search .......................... 73/304 R, 170 A; 340/580, 620; 336/30, 144

[56] References Cited

U.S. PATENT DOCUMENTS

| | | | |
|---|---|---|---|
| 3,058,345 | 10/1962 | Mastras | 73/304 R |
| 3,277,459 | 10/1966 | Werner | 340/234 |
| 3,314,287 | 4/1967 | Blankers | 73/170 A |
| 3,500,342 | 3/1970 | Bissett et al. | 340/173 |
| 3,853,005 | 12/1974 | Schendel | 73/290 R |
| 3,905,236 | 9/1975 | Henry | 73/304 R |
| 3,935,834 | 2/1976 | Buhrmann, Jr. | 116/114 V |
| 3,948,100 | 4/1976 | Paris et al. | 73/290 R |
| 4,165,641 | 8/1979 | Pomerantz et al. | 73/290 R |
| 4,182,176 | 1/1980 | Playfoot et al. | 73/290 R |
| 4,213,340 | 7/1980 | Cheng | 73/304 R |
| 4,229,972 | 10/1980 | Phillips et al. | 73/304 R |
| 4,287,472 | 9/1981 | Pan et al. | 324/65 R |

OTHER PUBLICATIONS

P. Hoekstra, A. Santorelli and S. Shinda, *Low Frequency Methods for Measuring Sea Ice Thickness,* Int'l Workshop on Remote Estimation of Sea Ice Thickness, Mem'l Univ., Newfoundland, Pub. No. 80-5, May 1980.

*Primary Examiner*—S. Clement Swisher
*Assistant Examiner*—Brian Tumm
*Attorney, Agent, or Firm*—Karen T. Burleson

[57] ABSTRACT

A method and apparatus for measuring the thickness of an ice sheet floating on a body of sea water is disclosed. The electrical inductance of a coil embedded in an ice sheet is measured. This inductance is solely dependent on the geometrical factors of the coil and is minimally affected by variations in salinity of the sea water on which the ice sheet is floating. The measured inductance is the actual inductance only of the part of the coil in the ice. The other part of the coil, protruding in the sea water, is shorted out by the sea water. Hence, the thickness of the ice sheet is directly related to the measured inductance.

10 Claims, 5 Drawing Figures

ICE THICKNESS INDUCTOR PROBE

FIELD OF THE INVENTION

This invention relates to a method and apparatus for measuring the thickness of an ice sheet floating on the surface of a body of sea water. More particularly, the invention pertains to an electrical ice thickness measuring apparatus which is embedded in the ice sheet and protrudes through the ice sheet into the sea water beneath the ice sheet.

BACKGROUND OF THE INVENTION

Various devices exist that can detect the presence of ice, but that cannot measure its thickness. One such device is described in U.S. Pat. No. 3,277,459 to Werner, issued Oct. 4, 1966. Various other devices are known that can sense or measure the level of a liquid. Examples include the devices described in U.S. Pat. Nos. 4,165,641 to Pomeratz et al, issued Aug. 28, 1979; 4,182,176 to Playfoot et al, issued Jan. 8, 1980; and 4,229,972 to Phillips et al, issued Oct. 28, 1980. Such devices, however, are often temperature sensitive and cannot accurately respond with fluctuating temperatures often present in sea water containing ice. Other devices can measure levels only of paramagnetic liquids, and not of sea water. An example of this type of device is disclosed in U.S. Pat. No. 3,948,100 to Parris et al, issued Apr. 6, 1976.

The liquid level measuring devices that have been most promising for use in measuring the thickness of floating ice are those employing resistors. An example is the liquid level measuring device described in U.S. Pat. No. 3,735,638 to Miller, issued May 29, 1973. A method disclosing the use of the electrical circuit of that device (and other devices with similar resistors) in a probe for measuring the thickness of ice was disclosed in U.S. Pat. No. 4,287,472 to Pan et al, issued Sept. 1, 1981. That method involves embedding a resistor in ice floating on sea water with part of the resistor extending through the ice into the sea water, measuring the electric resistance of the resistor, and relating this measurement to the ice thickness. The sea water, because of its low resistance or high conductivity relative to ice, reduces the effective length of the circuit and thereby decreases its overall resistance. The thickness of the ice is determined by correlating the measured resistance of the circuit with predetermined calibrated ice thickness values for the resistor.

With resistance devices, calibration is critical because a number of extraneous factors may affect the resistance measurements. One such factor is the salinity of the sea water. The salinity affects the resistivity and conductivity of the sea water, and hence affects the overall resistance of a resistor protruding into the sea water. The salinity of sea water, especially sea water containing ice, varies with time and place. Thus, re-calibration is necessary for each location having a different salinity from the previous location. Likewise, repeated calibration is necessary in the same location when the salinity varies, as when sea water is fed by a fresh water stream. Such repeated calibration is sometimes not feasible, and occasionally impossible.

A method for measuring the average thickness of ice floating in sea water, independent of the properties of the ice and dependent on the conductivity of the sea water, was suggested in a paper by P. Hoekstra, A. Sartorelli and S. Shinde entitled *Low Frequency Methods for Measuring Sea Ice Thickness* and presented at the International Workshop on Remote Estimation of Sea Ice Thickness held at St. Johns, Newfoundland in September of 1979. (C-CORE, Memorial University of Newfoundland, Pub. No. 80-5 (May, 1980)). That method employs a "Geonics EM31," a fiber glass boom with two co-planar magnetic dipoles, one mounted at each end, held over the ice. One magnetic dipole transmits current creating a primary field and inducing eddy current flow in the ice and underlying water. The eddy current causes a secondary magnetic field. The other magnetic dipole measures the ratio of these secondary and primary fields. Hoekstra et al. stated that the amount of eddy current flow in the ice and water is approximately proportional to the product of a geometric factor and the conductivity of the ice and water. Since the conductivity of sea ice is about two orders of magnitude less than the conductivity of sea water, Hoekstra et al. stated that the secondary field is proportional to the ice thickness or the height of the dipoles above the sea water. This method is severely limited, however, because it is impracticable for measuring the thickness of ice at a particular point (rather than the thickness of ice over a broader area) and for measuring the thickness of ice over an extended period of time (which is desirable, for example, in monitoring the growth or melting of the ice). Also, the method is affected by changes in salinity of the sea water because the method is dependent on the conductivity of the sea water and salinity affects conductivity.

A need exists for portable, accurate and economical devices and methods which do not require repeated calibration for measuring the thickness of ice sheets floating on bodies of sea water with varying salinity and which are versatile enough to allow measurement of ice thickness over a period of time.

SUMMARY OF THE INVENTION

The present invention provides a method and apparatus for measuring the thickness of ice sheets floating on bodies of sea water. Briefly, the invention employs an apparatus comprising a helical coil of wire (whose length is greater than its diameter), wound on a support, whose turns are as closely packed as possible without touching. The coil is embedded substantially vertically in the ice, with the uppermost turn of the coil level with the surface of the ice and the lower portion of the coil protruding into the sea water. Ice thickness is determined by passing alternating current through the coil, measuring the inductance of the coil, and correlating the measured inductance to ice thickness. Since the turns of the wire in the sea water will be shorted out (because of the high conductivity of the sea water relative to the ice), the measured inductance will only be the inductance of the part of the coil in the ice (which acts as an insulator). The inductance is dependent only on the geometrical factors of the coil and is minimally affected by the salinity of the water. Thus, so long as the ice is not thicker than the coil is long, the inductance of the coil is directly and unambiguously related to the length of the coil embedded in the ice and hence to the thickness of the ice itself.

The invention permits repeated, accurate measurements of ice thickness in sea water of varying salinity, ranging from brackish (less than 24.695°/$_{oo}$) to salty (equal to or greater than 24.695°/$_{oo}$), without the necessity for repeated calibration. (The symbol "°/$_{oo}$" is used to refer to "parts sea salt per thousand parts water.") The invention further permits continuous measurements at a particular point in the ice over extended periods of time. This permits continuous monitoring of ice growth or melt.

DETAILED DESCRIPTION OF THE INVENTION

The present invention is an apparatus and method for measuring the thickness of an ice sheet floating at the surface of a body of sea water. All references herein to "sea water" refer to water with a salinity greater than 0.3 parts sea salt per thousand parts water ("°/$_{oo}$"). Basically, the invention involves a coil of wire wound helically on a non-magnetic support. The thickness of the ice is determined by embedding the coil substantially vertically in the ice and measuring the inductance of the coil.

Figure 1:
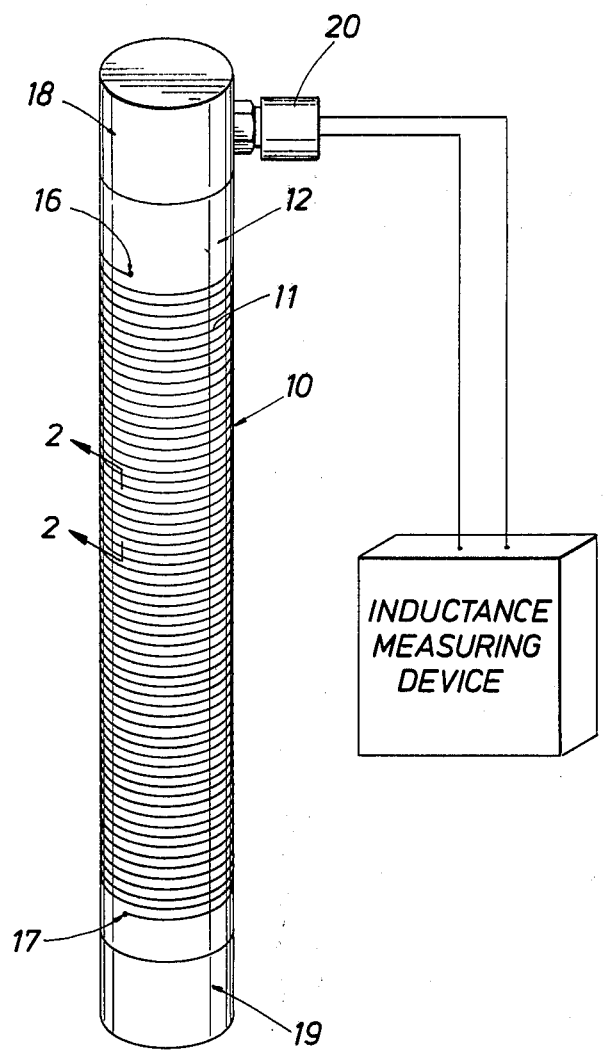
FIG. 1 illustrates one embodiment of the coil inductance apparatus for measuring the thickness of an ice sheet.

FIG. 1 illustrates one embodiment of the present invention for determining the thickness of ice floating at the surface of a body of sea water. The apparatus comprises a helix-type coil 10 of non-corroding, low resistance wire 11 whose resistance is preferably less than about one ohm per foot, such as stainless steel cable. As described below, the coil 10 is tightly wound on a support 12 of non-magnetic, non-electrically conducting tubing. The support 12 will preferably not become brittle in subzero (°C.) temperatures (which are typically found in the Arctic); and it will be rigid enough to support the coil and hold its shape even when subjected to pressure from the ice. One suitable material for the support is polyvinylchloride. The length of coil 10 is greater than its diameter; and the coil is closely packed, preferably with the turns as close as possible without touching, to maximize the inductance per unit length of coil. The turns should not touch, however, as such touching would cause shorting out of the coil.

The actual length of the coil will preferably exceed the anticipated thickness of the ice sheet to be measured. For example, if the anticipated thickness of the ice sheet is six feet, a coil six and one-half to seven feet long should be used.

The actual diameter of the coil, while less than the length of the coil, will preferably be that diameter which is practicable for the desired method of use of the apparatus. If the coil is to be embedded in the ice after the ice is formed, the coil will preferably be of a diameter to fill the space made in the ice by the embedding means. This ensures substantially vertical placement. If the coil is to be placed in the water prior to the formation of the ice, as by suspension from a buoy or float, the dimensions of the coil will be governed mainly by the coil's ability to withstand ice crushing pressure. The greater the diameter of the coil and hence also the diameter of the support, the greater will be the pressure of the ice on the coil and support. An example of a practicable diameter for a coil on a hollow, polyvinylchloride support to be embedded in an excavated hole in Arctic ice is three to four inches.

Figure 3:
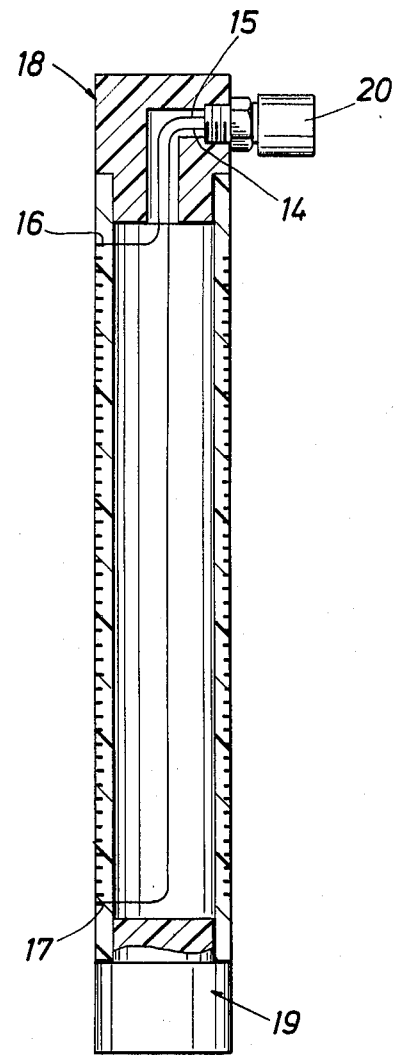
FIG. 3 is a view of the apparatus in FIG. 1, with a quarter section removed, showing the hollow center of the support through which the wire is returned to a source of current.
Figure 2:
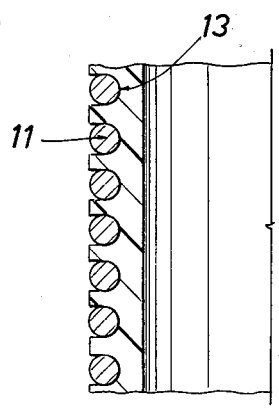
FIG. 2 illustrates an enlarged section of the apparatus in FIG. 1 cut along line 2 showing the wire positioned in the grooves of the support.

As shown in FIG. 2, the support 12 contains a helical groove 13 formed on its surface of a width and depth just sufficient to prevent the wire 11 from slipping and to allow partial embedding of the wire for protection while still allowing exposure of the wire's surface. The support 12 is hollow as shown in FIG. 3 to allow return of the ends 14 and 15 of the wire to the inside of the support for connection to a source of current without causing magnetic interference with the coil 10. The entry points 16 and 17 of the wire to the inside of the support 12 are sealed to prevent water from entering. Alternatively, the support could be solid with the ends of the wire returned to a source of current in a manner that would not give rise to magnetic interference with the measurements of the inductance of the coil. This could be accomplished, for example, by drilling holes in the inside of the support through which the ends of the wire could be returned to a source of current. The entry points of the wire to those holes would need to be sealed to prevent water from entering.

The hollow support 12 has solid caps 18 and 19 on each end to prevent water from entering. The caps can conveniently be composed of the same non-magnetic, non-electrically conducting material used to form the support 12, such as polyvinylchloride. The caps are joined to the support ends so as to provide a water tight fit, even in temperatures as low as −40° C. Cap 18, which will be preferably positioned above the ice, contains a connector 20 for connecting the wire to a current source as discussed above. Alternating current is used because, as a current with a time rate of change, it induces a magnetic field which is necessary for measurement of the inductance of a coil.

Figure 4:
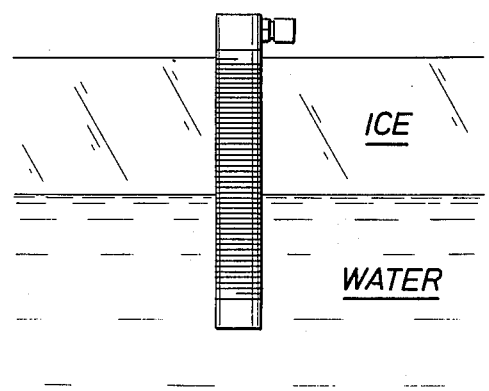
FIG. 4 illustrates the coil inductance apparatus of FIG. 1 embedded in an ice sheet floating on the surface of sea water.

For determining the thickness of the ice, the apparatus is preferably embedded substantially vertically in the ice as shown in FIG. 4. The uppermost turn of the coil 10 (at the cap 18 end of the support 12) is positioned so that the thickness of the portion of the ice extending above the apparatus is known. Preferably, the uppermost turn will be level with the upper surface of the floating ice. The lower portion of the coil will most preferably extend below the bottom of the ice sheet into the sea water. If the entire device were embedded in the ice with no part of the coil extending into the water, the thickness of the ice could not be determined exactly. However, it would indicate that the ice was as thick as or thicker than the apparatus, which can be useful information, e.g. to predict whether the ice is of sufficient thickness to make construction on the ice surface safe.

The actual embedding of the device may be accomplished any number of ways, such as by excavating a hole in the ice and inserting the device, or by positioning the device by buoy in water before it freezes so that the ice forms around the device. Once embedded, the coil is connected to a source of alternating current so that the coil then forms part of a closed circuit, such as a bridge circuit. The current is transmitted through the coil and the inductance of the coil is measured.

Inductance measurements are preferably made with a device capable of computing and directly giving the exact inductance of the coil in the circuit, separate from the inductance of the entire circuit, such as with a LCR Bridge directly interfaced with a computer appropriately programmed to do so. The coil is preferably positioned in the circuit so that its terminals are connected in series to the other elements of the circuit so that a series inductance measurement for the coil may be obtained. Recognizing that: (1) the sea water shorts out the turns of the wire in the water, (2) the measured inductance is actually the inductance of the part of the coil embedded in the ice, and (3) this inductance may be expressed by the formula, $$L = \mu_o n^2 l A$$

where
- L is the measured series inductance in henries,
- $\mu_o$ is the magnetic permeability of air in henries/meter,
- n is the number of turns of wire per unit length in (meters)$^{-1}$,
- l is the length of the coil in meters, and
- A is the cross-sectional area of the coil in square meters, one may calculate the length of the coil giving rise to the measured inductance L. Significantly, measurement of ice thickness according to this invention is dependent solely on the geometrical factors of the coil and is minimally affected by variations in the salinity of the sea water. Inductance L directly relates to the effective coil "length" equivalent to the "thickness" of the ice in which the coil is embedded.

EXPERIMENTAL

Laboratory results indicate that inductance measurements obtained through the practice of this invention are minimally affected by variations in salinity of sea water. In an experiment, an apparatus comprising a coil of one thirty-second (1/32) inch diameter stainless steel wire rope, with a resistivity of one ohm per foot, wound in the helical groove on a support of hollow polyvinylchloride tubing approximately three and one-half inches in diameter and approximately thirty inches long was employed. The groove caused the coil to have sixteen turns per inch of coil length. The support was somewhat longer than the coil's thirty inches and resembled in appearance the apparatus depicted in FIG. 1. Caps of polyvinylchloride were attached to both ends of the pipe with RTV silicone sealant for waterproofing. The ends of the wire rope were passed through the support wall to its hollow interior, brought to the top of the support, and connected to a current terminal in the top cap. This terminal was connected to a source of alternating current.

Four tests were run with water ranging in salinity from 21°/$_{oo}$ to 7°/$_{oo}$. The water for these tests was from the tap and was made saline with synthetic sea salt whose chemical composition, like the salt found naturally in sea water, consists of approximately 58.5% sodium chloride, 26.5% magnesium chloride, 9.8% sodium sulfate, 2.8% calcium chloride, and 2.4% other salts. A fifth test was run with tap water to which no salt was added.

The water was held in a tank of sufficient depth to immerse the coil. For each test, the coil was lowered in the tank in approximately one-inch increments. At each increment the actual length of the coil in the air was measured with a ruler and the inductance of the coil was measured with a Hewlett Packard 4262A Digital LCR meter with an operating frequency of 10 kHz. Air was substituted for ice as the "insulator" for the part of the coil not in the water. Like the conductance of sea ice, the conductance of air is about two orders of magnitude less than the inductance of sea water. Therefore, the measurements taken with the apparatus in air are similar to those that would be expected with the apparatus embedded in sea ice.

Although the apparatus is insensitive to variations in sea water salinity, an initial, one-time correction may be applied in setting the value of "A", the cross-sectional area of the coil. Due to material and construction variations, the effective area may be slightly different from the actual area. This correction may easily be determined. For example, in the experiment, the inductance of the coil completely in air was measured and the cross-sectional area of a 30 inch, 16 turns per inch coil was calculated from the formula, $L = \mu_o n^2 l A$, described above. This area was calculated to be 7.18 square inches, which is the area of such a coil with a diameter of 3.02 inches (compared to the actual measured diameter of 3.5 inches). Hence, this particular coil has an effective area of, or has the inductance of, an ideal coil of the same length and with the same number of turns that has a diameter of 3.02 inches. This value of "A" was then used in calculating length "l" from measured inductance values. Such an initial correction will be preferred when especially accurate thickness measurements are desired.

Because of noise in the series mode (to which the formula, $L = \mu_o n^2 l A$, described above and employed in this invention applies), inductance was read in the parallel mode and converted to the series inductance measurement for application in the formula $L = \mu_o n^2 l A$, according to this invention. Parallel inductance measurements may be converted to series inductance measurements by measuring the dissipation factor of the coil when measuring the coil's parallel inductance and then applying the formula, $$L = \frac{1}{1 + D^2} L p$$

where
- L is series inductance (the same inductance as is determined by the formula $L = \mu_o n^2 l A$) in henries,
- D is the dissipation factor of the coil; and
- Lp is parallel inductance in henries.

The dissipation factor of the coil in this experiment was taken with the Hewlett Packard 4262A Digital LCR meter with an operating frequency of 10 kHz when the coil's parallel inductance was measured using the same meter.

Data obtained in the experiment is shown in Table I below.

TABLE I

| Test Conditions and Data | | | |
|---|---|---|---|
| Test Increments (inches) (actual length of coil in air) | Lp(mH) | D | L(mH) (calculated) |
| TEST 1 Salinity = 21.0°/$_{oo}$ | | | |
| 29.00 | 26.85 | 3.79 | 1.74 |
| 28.00 | 26.10 | 3.81 | 1.68 |
| 27.00 | 25.10 | 3.80 | 1.62 |
| 26.00 | 24.15 | 3.79 | 1.57 |

TABLE I-continued

Test Conditions and Data

| Test Increments (inches) (actual length of coil in air) | Lp(mH) | D | L(mH) (calculated) |
|---|---|---|---|
| 25.00 | 23.40 | 3.83 | 1.49 |
| 24.00 | 22.40 | 3.83 | 1.43 |
| 23.00 | 21.40 | 3.84 | 1.36 |
| 22.00 | 20.20 | 3.75 | 1.34 |
| 21.00 | 19.10 | 3.73 | 1.28 |
| 20.00 | 18.30 | 3.73 | 1.23 |
| TEST 2 Salinity = 18.5°/oo | | | |
| 29.00 | 27.05 | 3.78 | 1.77 |
| 28.00 | 26.30 | 3.81 | 1.70 |
| 27.00 | 25.30 | 3.80 | 1.64 |
| 26.00 | 24.35 | 3.79 | 1.58 |
| 25.00 | 23.60 | 3.81 | 1.52 |
| 24.00 | 22.85 | 3.84 | 1.45 |
| 23.00 | 21.80 | 3.84 | 1.38 |
| 22.00 | 20.40 | 3.75 | 1.35 |
| 21.00 | 19.30 | 3.73 | 1.29 |
| 20.12 | 18.45 | 3.73 | 1.24 |
| TEST 3 Salinity = 11.0°/oo | | | |
| 29.00 | 27.10 | 3.76 | 1.79 |
| 28.00 | 26.60 | 3.80 | 1.72 |
| 27.00 | 25.60 | 3.80 | 1.65 |
| 26.00 | 24.50 | 3.79 | 1.59 |
| 25.00 | 23.80 | 3.82 | 1.53 |
| 24.00 | 23.00 | 3.85 | 1.45 |
| 23.00 | 22.10 | 3.84 | 1.40 |
| 22.00 | 20.60 | 3.76 | 1.36 |
| 21.00 | 19.50 | 3.74 | 1.30 |
| 20.00 | 18.70 | 3.74 | 1.25 |
| TEST 4 Salinity = 7.8°/oo | | | |
| 29.00 | 27.05 | 3.76 | 1.79 |
| 28.00 | 26.50 | 3.80 | 1.72 |
| 27.00 | 25.55 | 3.80 | 1.65 |
| 25.75 | 24.40 | 3.80 | 1.58 |
| 24.75 | 23.70 | 3.83 | 1.51 |
| 24.00 | 22.90 | 3.84 | 1.45 |
| 23.00 | 22.10 | 3.85 | 1.40 |
| 22.00 | 20.70 | 3.77 | 1.36 |
| 21.00 | 19.60 | 3.74 | 1.31 |
| 20.12 | 18.85 | 3.75 | 1.25 |
| TEST 5 Drinking Water From Tap | | | |
| 29.00 | 27.10 | 3.65 | 1.89 |
| 28.00 | 27.00 | 3.68 | 1.86 |
| 27.00 | 26.90 | 3.72 | 1.81 |
| 26.00 | 26.80 | 3.76 | 1.77 |
| 25.00 | 26.60 | 3.81 | 1.71 |
| 24.00 | 26.50 | 3.85 | 1.67 |
| 23.00 | 26.20 | 3.92 | 1.60 |
| 22.00 | 25.90 | 3.95 | 1.56 |
| 21.00 | 25.65 | 3.98 | 1.52 |
| 20.00 | 25.40 | 4.03 | 1.47 |

Figure 5:
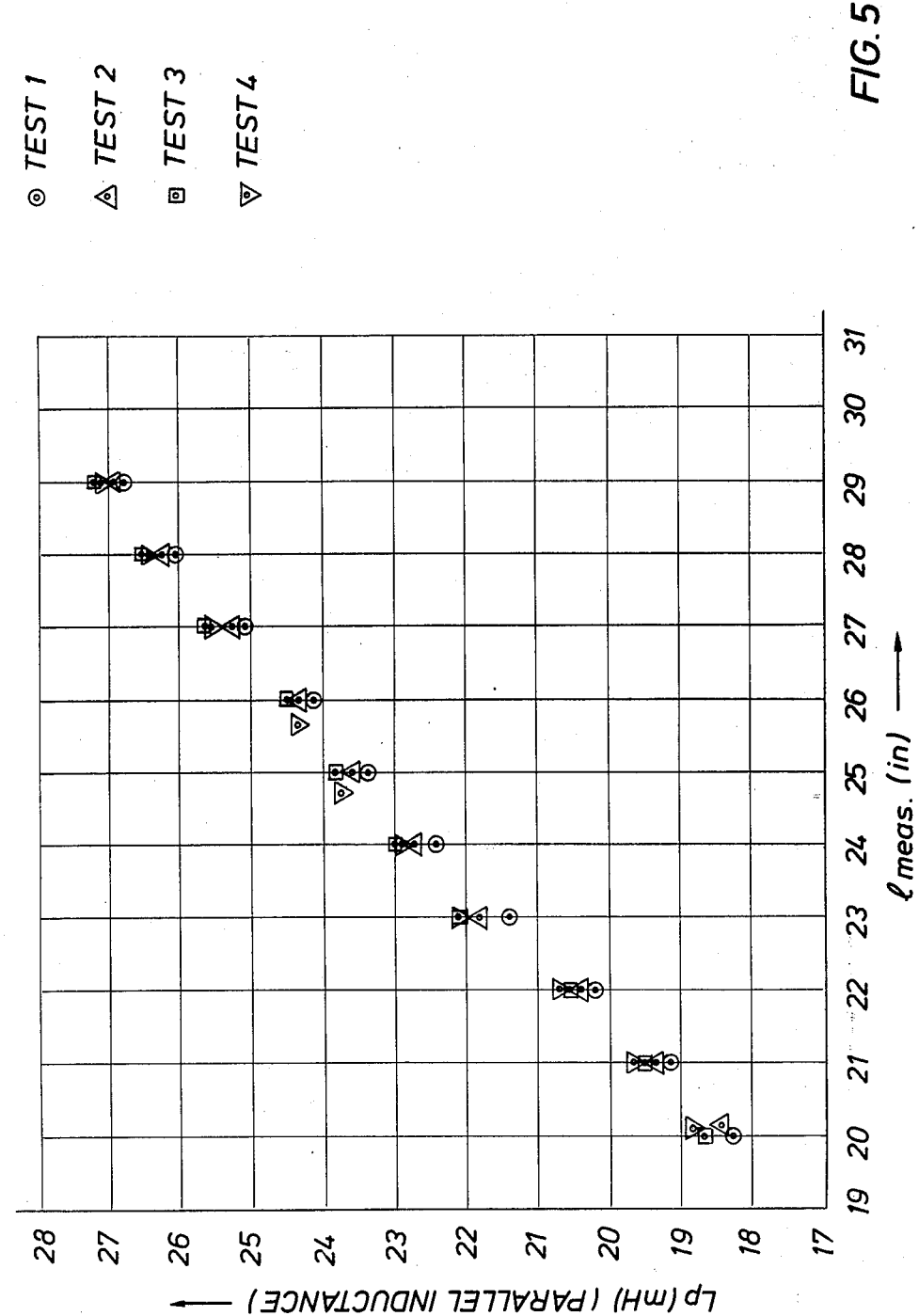
FIG. 5 is a plot of the parallel inductance of an experimental coil in air and water with salinities of 21.0, 18.5, 11.0 and 7.8°/$_{oo}$ versus the measured length of the portion of coil protruding out of the water into the air.

A graph of the first two columns in each test under Table I above is shown in FIG. 5. As will be discussed below, this graph illustrates that accurate ice thickness values may be obtained by measurement of inductance values, without reference to calibration curves, since inductance does not vary significantly over a wide salinity range.

To determine "l", the length of the coil, the formula $L = \mu_o n^2 l A$ was rewritten to be $l = L/(\mu_o n^2 A)$. Since "$\mu_o n^2 A$" was known, $\mu_o$ being equal to $3.20 \times 10^{-8}$ henries per inch, n being equal to 16 and A being equal to 7.18 square inches, the formula was reduced to $l = LC$, where "C" was a constant equal to $(\mu_o n^2 A)^{-1}$ or 17.04 inches per millihenry. Once "L" was obtained for each inductance measurement, the length of the coil was calculated for each increment in the tests and compared to the actual, ruler measured, length of the part of the coil in the air. The results of this comparison are shown in Table II.

TABLE II

Comparison of Actual and Calculated Coil Lengths for Different Salinities

| Actual Length (Inches) | l Calculated (Inches) | Percent Error |
|---|---|---|
| TEST 1: Salinity = 21.0°/oo | | |
| 29.00 | 29.78 | 2.69 |
| 28.00 | 28.66 | 2.37 |
| 27.00 | 27.70 | 2.60 |
| 26.00 | 26.78 | 3.02 |
| 25.00 | 25.45 | 1.79 |
| 24.00 | 24.36 | 1.50 |
| 23.00 | 23.16 | 0.69 |
| 22.00 | 22.85 | 3.87 |
| 21.00 | 21.82 | 3.93 |
| 20.00 | 20.91 | 4.55 |
| TEST 2: Salinity = 18.5°/oo | | |
| 29.00 | 30.22 | 4.22 |
| 28.00 | 28.88 | 3.15 |
| 27.00 | 27.92 | 3.41 |
| 26.00 | 27.00 | 3.87 |
| 25.00 | 25.92 | 3.67 |
| 24.00 | 24.73 | 3.04 |
| 23.00 | 23.59 | 2.57 |
| 22.00 | 23.08 | 4.90 |
| 21.00 | 22.05 | 5.01 |
| 20.12 | 21.0 | 4.75 |
| TEST 3: Salinity = 11.0°/oo | | |
| 29.00 | 30.51 | 5.19 |
| 28.00 | 29.28 | 4.59 |
| 27.00 | 28.18 | 4.38 |
| 26.00 | 27.17 | 4.51 |
| 25.00 | 26.01 | 4.04 |
| 24.00 | 24.77 | 3.21 |
| 23.00 | 23.92 | 3.99 |
| 22.00 | 23.19 | 5.40 |
| 21.00 | 22.23 | 5.84 |
| 20.00 | 21.26 | 6.30 |
| TEST 4: Salinity = 7.8°/oo | | |
| 29.00 | 30.45 | 5.00 |
| 28.00 | 29.24 | 4.45 |
| 27.00 | 28.13 | 4.18 |
| 25.75 | 26.99 | 4.83 |
| 24.75 | 25.77 | 4.14 |
| 24.00 | 24.78 | 3.26 |
| 23.00 | 23.80 | 3.48 |
| 22.00 | 23.19 | 5.39 |
| 21.00 | 22.28 | 6.11 |
| 20.12 | 21.30 | 5.96 |
| TEST 5: Drinking Water From Tap | | |
| 29.00 | 32.24 | 11.18 |
| 28.00 | 31.63 | 12.99 |
| 27.00 | 30.89 | 14.41 |
| 26.00 | 30.16 | 16.03 |
| 25.00 | 29.14 | 16.56 |
| 24.00 | 28.54 | 18.91 |
| 23.00 | 27.28 | 18.60 |
| 22.00 | 26.58 | 20.83 |
| 21.00 | 25.89 | 23.30 |
| 20.00 | 25.10 | 25.50 |

FIG. 5, the graph of the actual length of the part of the coil in the air, as measured with a ruler, for each increment in each test versus the parallel inductance of the coil measured for that increment, shows that the inductance measurements for each increment varied little with changes in salinity of the water in which the coil extended. A straight line can be drawn through the points of the graph, positioned at approximately forty-five degrees between the two axes. This fact illustrates a direct relationship between the measured inductance of the coil and the coil length. The actual and calculated coil lengths for tests 1 through 4, compared in Table II, indicate a direct relationship between the measured inductance of the coil and the length of the coil extending in the air, which relationship does not generally depend on salinity.

The tap water used in Test 5 did not contain enough salt to make its conductivity high enough to sufficiently short out the coil. Hence, errors as great as 25% were seen. Use of the apparatus to measure ice thickness in fresh water is, therefore, not preferred.

Tests 1 through 4 indicate that for salt applications, the invention gives excellent results. The percentage of error shown in Table II for these tests ranges from about one to six percent. This is acceptable. For example, in the Arctic where ice sheets can typically be six feet or more in thickness, a six percent error in measurement of that thickness makes the measurement vary only about four inches from the actual thickness of the ice. From that measurement, it is safe to determine whether the ice is thick enough, for example, to support the weight of objects to be moved across it.

The principle of the invention and the best mode contemplated for applying that principle have been described. It is to be understood that the foregoing is illustrative only, that this invention should not be limited to the specific experiment set forth herein, and that other means and techniques can be employed without departing from the true scope of the invention defined in the following claims.

We claim:

1. An apparatus for determining the thickness of an ice sheet floating on a body of sea water, comprising:
   (a) an elongated support constructed from non-magnetic, non-electrically conducting material capable of withstanding subzero (°C.) temperatures without becoming brittle and having a helical groove formed about an outer surface;
   (b) a coil of non-corroding, low resistance wire wound in a closely packed helix, whose length is greater than its diameter, in said helical groove;
   (c) means for connecting said coil to a source of alternating current; and
   (d) means for measuring an inductance value of said coil and relating said inductance value to the thickness of said ice sheet.

2. A method for determining the thickness of an ice sheet floating at the surface of a body of sea water, which comprises:
   (a) embedding a coil wound in a helical arrangement about a nonconducting support in an ice sheet floating on a body of sea water;
   (b) transmitting an alternating current through said coil;
   (c) measuring the inductance of said coil;
   (d) determining the length of said coil which is embedded in said ice sheet from said measured inductance; and
   (e) equating said length to the thickness of said ice sheet.

3. The method according to claim 2 wherein steps (c), (d) and (e) are performed continuously over a period of time to monitor continuously the thickness of said ice sheet.

4. The method according to claim 2 which further comprises embedding said coil in the ice sheet so that an uppermost turn of the coil is level with and adjacent to an upper surface of said ice sheet.

5. The method according to claim 2 which further comprises embedding said coil in said ice sheet so that a lower portion of said coil protrudes beneath the bottom of said ice sheet into the sea water exposing at least one turn of the coil to the sea water.

6. A method for measuring the thickness of an ice sheet floating at the surface of a body of sea water, said method comprising the steps of:
   (a) placing a coil wound in a helical arrangement about a non-conducting support in sea water before said ice sheet begins to form;
   (b) allowing said ice sheet to form around said coil;
   (c) transmitting an alternating current through said coil;
   (d) measuring the inductance of said coil;
   (e) determining the length of said coil, around which said ice sheet formed, from said measured inductance; and
   (f) equating said length to the thickness of said ice sheet.

7. A method according to claim 6 wherein steps (d), (e), and (f) are continuously performed over a period of time to continuously monitor the thickness of said ice sheet.

8. A method for measuring the thickness of an ice sheet floating at the surface of a body of sea water, the salinity of said sea water varying over time, the method comprising the steps of:
   (a) embedding a coil wound in a helical arrangement about a nonconducting support in an ice sheet floating on said water;
   (b) transmitting an alternating current through said coil;
   (c) measuring the inductance of said coil;
   (d) determining the length of said coil which is embedded in said ice sheet from said inductance, which is unaffected by varying salinity of said sea water, and without reference to salinity calibrated values, by applying the formula:

$$L = \mu_o n^2 l A$$

where
   L is the measured series inductance in henries,
   $\mu_o$ is the magnetic permeability of air in henries/meter,
   n is the number of turns of wire per unit length in (meters)$^{-1}$,
   l is the length of the coil in meters, and
   A is the cross-sectional area of the coil in square meters; and
   (e) equating said length to the thickness of said ice sheet.

9. A method according to claim 8 wherein steps (c), (d) and (e) are continuously performed over a predetermined length of time to continuously monitor the thickness of said ice sheet.

10. A method according to claim 8 further comprising initially measuring the inductance of said coil in air prior to step (a) and determining therefrom an effective cross-sectional area for said coil.

* * * * *